United States Patent Office 3,148,041
Patented Sept. 8, 1964

3,148,041
RECOVERY OF CHLORINATED METHANES
Frederick Chris Dehn and Robert E. Feathers, New Martinsville, W. Va., assignors to Pittsburgh Plate Glass Company, Pittsburgh, Pa., a corporation of Pennsylvania
No Drawing. Continuation of application Ser. No. 812,578, May 12, 1959. This application Nov. 21, 1961, Ser. No. 154,062
11 Claims. (Cl. 55—31)

The present invention relates to a method of recovering chlorinated methanes. More particularly, the present invention relates to the recovery of chlorinated methanes from gas mixtures produced by the oxychlorination of methane.

It has been proposed to chlorinate lower aliphatic hydrocarbons such as methane, utilizing gaseous hydrogen chloride as the chlorinating agent. In processes of this type, gaseous hydrogen chloride and an oxygen containing gas such as air, and the hydrocarbon to be chlorinated are passed in contact with a metal halide catalyst. By a series of well known reactions, elemental chlorine ($Cl_2$) is released from the hydrogen chloride and chlorinates the hydrocarbon feed material. In another modification of this process, elemental chlorine ($Cl_2$) is used as the feed gas in place of gaseous HCl. This latter process operates in a manner similar to the first except that an initial chlorination of hydrocarbon takes place. Thus, free chlorine, an oxygen containing gas, and the hydrocarbon to be chlorinated are passed in contact with a metal halide catalyst. The chlorine reacts with the hydrocarbon to produce hydrogen chloride and a chlorinated product of the hydrocarbon. Hydrogen chloride produced in this manner is then converted to elemental chlorine by a well known series of reactions, thereby providing additional chlorine for the chlorination of more hydrocarbon feed.

Although chlorinations of this type are well known in the art, there are serious operational difficulties generally associated with them. Thus, for example, it is found that serious difficulty arises in the recovery of the chlorinated hydrocarbon products issuing from such reactions. This is due in part to the fact that the chlorinated hydrocarbon products are diluted in great quantities of inert or noncondensible gases such as elemental nitrogen, carbon monoxide, carbon dioxide, and other like gases. In order to recover the products satisfactorily from such a process, therefore, it is necessary to process great quantities of gas and efficiently recover the chlorinated hydrocarbon content thereof.

According to the present invention, it has been found that by contacting gas mixtures containing chlorinated methanes and predominating quantities of noncondensible gaseous components with a liquid aromatic halogenated hydrocarbon, that it is possible to absorb essentially all of the chlorinated methane content of such a mixture while permitting the non-chlorinated methane constituents of the gas mixture to pass through the absorbent. Recovery of the absorbed chlorinated methanes from the liquid aromatic halogenated hydrocarbon can conveniently be accomplished by simple distillation techniques. In addition to efficiently recovering the chlorinated methane content of a predominantly noncondensible gas stream, it is found that little or no liquid aromatic halogenated hydrocarbon absorbing material is swept out of the contact area during the absorption. The process lends itself to operations which are conducted either on a continuous basis or as batch-type operations.

Typical compounds contemplated are halogenated diphenyls such as 2-bromodiphenyl, 2-chlorodiphenyl; halogenated naphthalenes such as 1-bromonaphthalene, 1-chloronaphthalene, 1,2-dichloronaphthalene; halobenzenes and mixtures thereof. The contemplated aromatic halogenated hydrocarbon and mixtures thereof normally are liquid at 25° C. and atmospheric pressure. In all events, they include compounds having melting points below 50 to 75° C. and boiling points above 130° C. at atmospheric pressure (760 millimeters of mercury). Liquid halobenzenes form a preferred solvent in the herein disclosed process.

The term "halobenzenes" as used herein in the specification and claims in describing the absorbing medium, is intended to include halogen substituted benzenes having the physical characteristics referred to above. The halogen substituted benzenes may contain one or more halogens on the ring and they may be mixed halogens or a single species. In addition to the presence of halogen substitutions, substituted functional groups may also be present on the ring. Thus, hydroxyl, nitro, alkyl, and other like groups may be substituted on the ring in addition to the halogen present.

Typical of some of the halobenzene absorbing materials contemplated for use in the present invention, are 1,2-dichlorobenzene; 1,3-dichlorobenzene; 1,4-dichlorobenzene; chlorobenzene; 1-chloro-2-nitrobenzene; 1-chloro-3-nitrobenzene; bromobenzene; 1-bromo-3-chlorobenzene; 1-bromo-4-chlorobenzene; 1-bromo-2-iodobenzene; 1-bromo-2-nitrobenzene; 1,2-dibromobenzene; 1,3-dibromobenzene; 1,2,3,4-tetrachlorobenzene; 1,2,3,5-tetrachlorobenzene; 1,3,5-trichlorobenzene; 1-chloro-2,4-dinitrobenzene; 4-chloro-1,2-dinitrobenzene; 1-chloro-4-fluorobenzene; 1-chloro-2-hydroxybenzene; 1-chloro-3-hydroxybenzene; 1-chloro-4-hydroxybenzene; 2,3-dichlorophenol; 2,4-dichlorophenol; 2,5-dichlorophenol; 2,6-dichlorophenol; 3,4-dichlorophenol; 3,5-dichlorophenol; 2-chloro-1-methylbenzene; 3-chloro-1-methylbenzene; 4-chloro-1-methylbenzene; 4,6-dibromo-1,3-dimethylbenzene; 1,2,4-trichlorobenzene; o-xylyl bromide; 4-bromo-o-xylene; o-xylyl chloride; o-xylylene chloride, and other like compounds. Mixtures of halobenzenes may also be employed provided the mixture employed exhibits the melting point and boiling point characteristics hereinabove set forth. Orthodichlorobenzene forms a preferred solvent for the absorption of chlorinated methanes.

Gas streams containing predominating quantities of inert or noncondensible gases with low concentrations ranging below 25 percent by volume of chlorinated methanes, are produced during the oxychlorination of methane in the presence of a catalyst, utilizing either HCl or elemental chlorine ($Cl_2$) as the chlorinating agent together with oxygen. Processes of this type are conducted in the presence of a metal halide catalyst and usually in tubular reactors, though other type reactors may be employed.

The metal used in the catalyst is one of variable valence such as copper, chromium, iron and the like, and may be employed alone or in combination with other metals such as sodium, potassium and the like. Preferably, catalysts are in the form of metal chloride salts and are impregnated on an inert material which provides considerable surface area for the process reactants to contact the catalyst. Various carriers may be employed such as, for example, silica gel, alumina, kieselguhr, pumice and other well known carrier materials. A particularly suitable material is Celite, a calcined diatomaceous earth (Lompoc, California, diatomite) manufactured by the Johns-Manville Corporation. This material impregnated with a cupric chloride-potassium chloride catalyst, has been found particularly desirable in conducting oxychlorination reactions of the type which produce gas mixtures containing low chlorinated methane volume concentrations.

A free elemental oxygen containing gas is employed as one of the feed materials in these reactions. Thus, elemental oxygen is found suitable for use in the process and may be employed alone or mixed with various inert diluents such as nitrogen, argon, neon and the like. Air comprises a particularly suitable gas for supplying elemental oxygen to the process since it is easily obtained and inexpensive. Other types of oxygen containing gases, that is, gases which contain elemental oxygen ($O_2$) therein, may also be employed. Thus, oxygen enriched air, oxygen or air mixed with inert gases, or vapors or mixtures of oxygen, air and inert gases or vapors may be conveniently utilized in accordance with the teachings of the present invention without impairing the results in any way.

Generally, temperature and pressure conditions utilized in an oxychlorination reaction may be varied considerably without seriously interfering with the process. While it is preferred to operate the system at or near atmospheric pressures for operational convenience, both superatmospheric pressures and subatmospheric pressures may be utilized if desired. Similarly, temperatures between 450° C. to about 550° C. are preferably employed in the catalyst zones contained in the reactors. Considerable variations in these temperatures may be made, however, without detrimental effect, thus temperatures may be lowered to 350° C. or lower, or raised to 700° C. or higher, if desired.

The feed ratios of the various components of the feed gases reacted in the catalyst zones may be subjected to considerable variation without seriously interfering with the process. Thus, for example, the chlorinating agent employed may be fed to the system at a rate such that from between 0.5 mole to about 5 moles, or even more, chlorinating agent is supplied for each mole of the hydrocarbon fed. Less than 0.5 mole of chlorinating agent may be utilized for each mole of hydrocarbon fed in the process of this invention, but will usually result in supplying too small a quantity of chlorine to completely chlorinate all of the hydrocarbon fed. Employment of a chlorinating agent in excess of 5 moles for each mole of hydrocarbon, is likewise permissible though chlorine will be supplied in quantities greater than necessary to completely chlorinate all of the hydrocarbon fed.

Oxygen is supplied to insure the complete oxidation of the chlorinating medium. Considerable amounts of excess oxygen may be employed if desired, but quantities supplying more than 5 percent by volume free oxygen in the exit gas stream are not particularly beneficial. Oxygen content of the feed gases is therefore preferably maintained so that between about 0.8 mole and 1.5 moles of free oxygen are supplied to the system for each mole of chlorinating agent. The hydrocarbon feed material may comprise preferably methane, but natural gas or any other gaseous mixture containing predominating quantities of methane may be employed as hydrocarbon feed material.

Gas mixtures containing small volumes of chlorinated methanes in large quantities of inert gas are conveniently produced by charging a jacketed tubular reactor throughout a substantial portion of its length, with a metal halide catalyst impregnated on an inert carrier material. The reactor is regulated in temperature by circulating a molten salt mixture or other suitable heat transfer material in the jacket of the reactor. A mixture of the methane to be chlorinated, an oxygen containing gas and a chlorinating agent selected from the group consisting of HCl, $Cl_2$ or a mixture of HCl and $Cl_2$ are fed into the reactor at one end. The gaseous reactant products are removed at the end of the reactor opposite the feed inlet and either continuously or at periodic intervals of time, are introduced into an absorbing zone and contacted with the liquid aromatic halogenated hydrocarbon solvent. Contact of the gaseous mixture with the liquid aromatic halogenated hydrocarbon results in the absorption of the chlorinated methane content of the gas stream while permitting substantially all of the inert gaseous components of the mixture to pass through the solvent unaffected. The liquid absorbent is found quite stable and little or no loss of absorbent occurs despite the large quantities of gases passing in contact with it.

Absorption techniques contemplated for use in recovering chlorinated methanes from gas mixtures in accordance with the teachings herein set forth, include both pressure absorption systems and absorption systems operated under substantially atmospheric conditions. Packed, unpacked, bubble cap, perforated plate and other similar type columns are typical of equipment which is conveniently utilized to conduct the absorption of chlorinated methanes. Packed columns typically contain beryl saddles, Raschig rings or other suitable packing material. As a preferred mode of operation, packed columns containing beryl saddles are employed. Conventional structural materials, preferably corrosion resistant such as steel, nickel, glass and alloys lined or unlined, are utilized in constructing the columns utilized herein.

The ratio of the feeds to the absorption zones is considerably variable and will depend upon the efficiency of the column employed. Generally, low ratios of liquid to gas are desirable since they reduce considerably equipment requirements for handling large quantities of liquid. Thus, molar ratios of between 1 and 15 are usually satisfactory and preferably, ratios between 1 and 10 are employed. Ratios lower than the above ranges, if capable, are desirable.

Column temperatures may vary somewhat, though it is preferable to operate the system at the lowest possible temperature compatible with the physical properties of the absorbent utilized. Ambient temperatures (25° C.) where permissible are preferred.

Desorption of the chlorinated methanes from the liquid aromatic halogenated hydrocarbon in accordance with this invention, is preferably accomplished by recourse to steam stripping techniques. Stripping columns employed may be packed, unpacked, bubble cap, perforated plate, and the like. Packed columns form a preferred embodiment and beryl saddles, Raschig rings and like packing are employed in the column. Corrosion resistant structural materials are generally utilized to construct the desorption apparatus and materials such as stainless steel, nickel, glass, ceramic lined steel, are typical of types of material employed.

During desorption, the chlorinated methane containing solvent is fed to the desorption column, preferably at or above the midpoint, and steam is introduced to the column, preferably at the bottom. The rising steam thus countercurrently contacts the liquid solvent fed to the column. The column overhead containing steam and the chlorinated methanes with substantially no halogenated hydrocarbon solvent, i.e., less than 0.1 percent by weight of the overhead, is passed to a condenser and phase separated. Part of the chlorinated methanes may be returned to the column as reflux, while the major portion is removed to a still line for fractionation or to storage. Water is removed from the phase separator and reused as steam or discarded. The recovered chlorinated methanes may be separated by recourse to conventional distillations. Steam requirements for a given system will depend upon the quantity of solvent liquid fed to the column. Generally, enough water is supplied in the form of steam to accomplish the distillation of the chlorinated methane content thereof. Generally, a water feed of between 0.5 and 5.0 moles based on the moles of chloromethane present is deemed adequate. Slight excesses are preferably used. Desorption columns may be operated at pressures ranging from atmospheric to 100 pounds per square inch gauge. Temperatures will vary according to the pressure employed. Thus, for a column operated at 20 pounds per square inch gauge pressure, the top of the column is operated at about 34° C. with a bottom temperature of about 122° C. Pressure changes in column operation will of course cause a corresponding variation in the temperatures within the column. The stripped liquid aromatic halogenated hydrocarbon containing substantially no chlorinated methanes is removed from the bottom of the column and recycled to the absorption zone. Recycled liquid solvent contains less than 0.20 percent chloromethanes by weight.

Gases fed in contact with the absorbing liquid are passed from an oxychlorination reactor typically through water and caustic scrubbers and, if desired, may be dried by contact with a bed of calcium chloride before being admitted to the absorber. While scrubbing and drying of the reactor effluent or gaseous chlorinated methane containing streams forms a preferred mode of operation, it is of course understood that this is not limitative in any way since experiments have indicated that both wet and dry gases may be employed. Passing the reactor effluent through water is preferable where HCl recovery is desirable. If HCl is not to be recovered an alkali scrubber alone may be employed. Caustic soda solutions are preferably employed in the alkali scrubber but recourse to other bases such as calcium hydroxide and the like is permissible. In the preferred method of operating this process a water scrubber is employed to first contact the oxychlorination reaction product gases and this is followed by a caustic soda solution scrubber to insure complete removal of HCl from the gases. In this manner of operation, most of the HCl is recovered by the water in usable condition and small residual amounts are removed in the caustic scrubber as waste material.

The invention will be more readily understood from the following examples which are given as illustrative of modes of operation which may be employed in conducting the process of this invention.

EXAMPLE I

A catalyst was prepared by dissolving 441.0 grams of $CuCl_2.2H_2O$ and 186.8 grams of KCl in 1,000 milliliters of distilled water. One thousand milliliters of Celite pellets (¼ inch by ¼ inch) were added to the solution and allowed to soak for a period of 24 hours at ambient temperatures (25° C.) The supernatant liquor (860 milliliters) was drained off and the pellets dried with a Westinghouse sun lamp at a temperature of 110° C. The dried pellets had a solids loading of 33.1 percent by weight of salts corresponding to 7.82 percent copper, 5.48 percent potassium and 13.65 percent chloride ions by weight of impregnated carrier.

EXAMPLE II

Two reactors were utilized to conduct the oxychlorination of methane. Reactor number 1 was a jacketed 1½-inch internal diameter tubular reactor containing an 84-inch bed of catalyst material prepared in accordance with Example I. The second reactor was a jacketed 1½-inch internal diameter reactor containing a 108-inch bed of catalyst material prepared in accordance with Example I. During these runs, a contact time of 3.1 seconds was utilized with a gas ratio of feed components comprising methane to HCl to air of 1 to 1.8 to 5.5 on a mole basis. A molten salt mixture was circulated in the reactor jackets and maintained at a temperature of 370° C. The absorbing column utilized was constructed of a 2-inch Pyrex pipe packed with ¼-inch ceramic Raschig rings to a height of 9 feet 4 inches. The liquid 1,2,4-trichlorobenzene fed to the column was fed by gravity from a head tank at ambient temperature (25° C.) and metered through a tri-flat rotameter. The liquid 1,2,4-trichlorobenzene was metered to the column and allowed to percolate down into the bottom of the column and from the bottom was led to a reservoir connected thereto. The liquid was drained out of the absorber bottom continuously. A depth of liquid was maintained sufficient to prevent the incoming gas from short circuiting into the bottom reservoir. Liquid samples were taken from the bottom as desired through a stopcock provided thereon. An analysis of the vent gas from the absorber by mass spectrometer gave the level of chloromethanes leaving the absorber. To determine reactor productivity (chloromethane fed to the absorber), a regular product run was made in the reactors either directly before or directly after the absorber experiment under the same conditions of feed ratios, flows, bath temperatures, and the like as were employed during the absorption runs. The gaseous reactor effluents from both reactors were fed to the column and the column operated under varying conditions. The results of these experiments are shown below in Table I.

Table I

ABSORPTION EXPERIMENTS 1,2,4-TRICHLOROBENZENE AT ATMOSPHERIC PRESSURE

| Run Number | 1 | 2 | 3[1] | 4[1] |
|---|---|---|---|---|
| Length of run, min | 60 | 45 | 30 | 30 |
| Reactor Contact time, sec | 3.1 | 3.1 | 1.74 | 1.50 |
| Liquid T.C.B. rate, mls./min | 214 | 214 | 361 | 361 |
| Reactor output, gms./hr | 144.1 | 150.6 | 338.2 | 330.1 |
| $CH_3Cl$ out absorber, gms./hr | 1.13 | 2.05 | 14.55 | 19.42 |
| T.C.B. out absorber, gms./hr | | 1.72 | 3.74 | 4.62 |
| Percent Reactor output absorbed | 98.9 | 98.6 | 95.5 | 94.8 |
| Liquid/gas feed ratio (molar) | 9.64 | 7.61 | 5.84 | 5.03 |
| Moles $CH_3Cl$/mole gas in | 0.0263 | 0.0287 | 0.0288 | 0.0290 |
| Moles $CH_3Cl$/mole gas out | 0.002 | 0.001 | 0.010 | 0.012 |

[1] Runs 3 and 4 were conducted on reactor gases which were not dried before introduction to the absorber.

EXAMPLE III

The same reactor and absorber utilized in Example II were employed. The gas feeds and contact times employed are listed below in Table II. The reactor bath temperature was controlled at 370° C. In place of 1,2,4-trichlorobenzene, orthodichlorobenzene was employed as the absorption medium and the absorber was operated under a pressure of 30 pounds per square inch gauge. The effluent gases from the reactors were fed to the absorption system and the results are listed below in Table II.

Table II

| Experiment | 396 | 397 | 398 | 399 |
|---|---|---|---|---|
| $CH_4$ feed, moles/hr | 8.70 | 8.70 | 8.70 | 8.70 |
| $Cl_2$ feed, moles/hr | 7.56 | 7.56 | 7.56 | 7.56 |
| Air feed, moles/hr | 36.00 | 36.00 | 36.00 | 36.00 |
| Reactor contact time | 1.25 | 1.25 | 1.25 | 1.25 |
| Reactor output, gms./hr | 484.4 | 492.8 | 496.5 | 496.5 |
| Gms./hr. to absorber | 331.0 | 392.0 | 370.0 | 358.0 |
| $CH_3Cl$ lost thru vent, gms./hr | | | 0.58 | 1.24 |
| Percent CCl's absorbed | 100.0 | 100.0 | 99.8 | 99.6 |
| L/G ratio fed | 9.14 | 5.11 | 3.50 | 3.28 |
| Moles $CH_3Cl$/mol gas fed | 0.0396 | 0.0358 | 0.0298 | 0.0293 |
| Moles $CH_3Cl$/mol gas out | | | 0.001 | 0.001 |
| Ortho. lost, gms./hr | 5.20 | 6.00 | 4.4 | 4.2 |

As can be readily seen from an examination of the above tables, the recovery of chlorinated methanes contained in dilute quantities in an inert gas stream is efficiently accomplished utilizing liquid halobenzenes as the absorbing liquid. While all components were effectively removed, very little, if any, methyl chloride was lost during the absorption process. In addition, little or no loss of absorbing liquid took place. While in describing the invention and in the specific examples hereinabove referred to, emphasis has been placed upon a counter current contact of the gas with the liquid. It is of course understood that unidirectional flow of gas and liquid absorbing medium may also be employed.

In addition to the steam stripping recovery of product hereinabove mentioned, recovery of the chlorinated methane content of the halobenzene absorption liquid may also be accomplished by recourse to ordinary distillation technique. A simple heating of the absorbing liquid will readily drive off the methyl chloride content thereof and the recovery of the methylene chloride, chloroform and carbon tetrachloride fractions contained in the absorbing liquid may be readily obtained by distillation either on a batch basis or as a continuous system.

While the invention has been described with reference to certain specific examples, it is not intended to be limited thereto except insofar as appears in the accompanying claims.

This application is a continuation of our copending application, Serial No. 812,578, filed May 12, 1959, now abandoned.

We claim:

1. A method of recovering chloroform, carbon tetrachloride, methylene chloride and methyl chloride present as a gaseous mixture produced by the catalytic reaction of methane, an oxygen containing gas and a chlorinating agent selected from the group consisting of HCl, $Cl_2$ and mixtures of HCl and $Cl_2$ at elevated temperature, said mixture containing below 25 percent chlorinated methanes by volume, comprising scrubbing said gaseous mixture with an aqueous alkaline solution and contacting the gaseous mixture so scrubbed with a liquid halobenzene thereby selectively absorbing the chlorinated methane content of said mixture in said liquid halobenzene and recovering the chlorinated methanes from said liquid halobenzene.

2. The method of claim 1 wherein the liquid halobenzene is ortho-dichlorobenzene.

3. The method of claim 1 wherein the liquid halobenzene is 1,2,4-trichlorobenzene.

4. A method of recovering chloroform, carbon tetrachloride, methylene chloride and methyl chloride present as a gaseous mixture produced by the catalytic reaction of methane, an oxygen containing gas and a chlorinating agent selected from the group consisting of HCl, $Cl_2$ and mixtures of HCl and $Cl_2$ at elevated temperature, said mixture containing below 25 percent chlorinated methanes by volume, comprising scrubbing said gaseous mixture in sequence with water and an aquous sodium hydroxide solution and contacting the gaseous mixture so scrubbed with a liquid halobenzene thereby selectively absorbing the chlorinated methane content of the mixture in said liquid halobenezne and recovering said chlorinated methanes from said liquid halobenzene.

5. The method of claim 4 wherein the gaseous mixture is dried after the scrubbing steps and prior to being contacted with said liquid halobenzene.

6. The method of claim 4 wherein the liquid halobenzene is ortho-dichlorobenzene.

7. The method of claim 4 wherein the liquid halobenzene is 1,2,4-trichlorobenzene.

8. A method of recovering chloroform, carbon tetrachloride, methylene chloride and methyl chloride present as a gaseous mixture produced by the catalytic reaction of methane, an oxygen containing gas and a chlorinating agent selected from the group consisting of HCl, $Cl_2$ and mixtures of HCl and $Cl_2$ at elevated temperature, said mixture containing below 25 percent chlorinated methanes by volume, comprising scrubbing said gaseous mixture with water, drying the gaseous mixture so scrubbed and contacting the dried gaseous mixture with a liquid halobenzene thereby selectively absorbing the chlorinated methane content of said mixture in said liquid halobenzene and recovering the chlorinated methanes from said liquid halobenzene.

9. A method of recovering chloroform, carbon tetrachloride, methylene chloride and methyl chloride present as a gaseous mixture produced by the catalytic reaction of methane, an oxygen containing gas and a chlorinating agent selected from the group consisting of HCl, $Cl_2$ and mixtures of HCl and $Cl_2$ at elevated temperature comprising scrubbing said gaseous mixture with water and an aqueous sodium hydroxide solution, drying the said gaseous mixture so scrubbed and contacting the scrubbed and dried gaseous mixtures with a liquid halobenzene thereby selectively absorbing the chlorinated methane content of the gaseous mixtures in said liquid halobenzene and recovering the chlorinated methanes from said liquid halobenzene.

10. The method of claim 9 wherein the liquid halobenzene is ortho-dichlorobenzene.

11. The method of claim 9 wherein the liquid halobenzene is 1,2,4-trichlorobenzene.

References Cited in the file of this patent

UNITED STATES PATENTS

| | | |
|---|---|---|
| 2,585,469 | Johnson | Feb. 12, 1952 |
| 2,750,002 | Hooker et al. | June 12, 1956 |
| 2,841,243 | Hooker et al. | July 1, 1958 |
| 2,858,347 | Hutchings | Oct. 28, 1958 |
| 2,989,571 | Eisenlohr | June 20, 1961 |

FOREIGN PATENTS

| | | |
|---|---|---|
| 615,106 | Canada | Feb. 21, 1961 |